United States Patent [19]

Wright et al.

[11] 4,452,619

[45] Jun. 5, 1984

[54] PLEATED FILTER ELEMENT HAVING INTEGRAL PLEAT SPACERS

[75] Inventors: Mervin E. Wright, Apple Valley; Sheila C. Peyraud, Minnetonka; Bradley B. Nielsen, St. Louis Park, all of Minn.

[73] Assignee: Donaldson Company, Inc., Minneapolis, Minn.

[21] Appl. No.: 390,065

[22] Filed: Jun. 18, 1982

[51] Int. Cl.³ .................... B01D 27/06; B01D 46/52
[52] U.S. Cl. ................................. 55/521; 55/498; 55/500; 55/DIG. 5; 210/493.5
[58] Field of Search ............... 55/497, 498, 500, 521, 55/DIG. 5; 210/493.1–493.5

[56] References Cited

U.S. PATENT DOCUMENTS

| | | | |
|---|---|---|---|
| 2,298,980 | 10/1942 | Sloan et al. | 210/204 |
| 2,936,855 | 5/1960 | Allen et al. | 55/521 |
| 3,174,625 | 3/1965 | Briggs | 210/493 |
| 3,198,336 | 8/1965 | Hyslop | 210/457 |
| 3,392,843 | 7/1968 | Mumby | 210/457 |
| 3,531,920 | 10/1970 | Hart | 55/497 |

FOREIGN PATENT DOCUMENTS

| | | | |
|---|---|---|---|
| 656859 | 1/1963 | Canada | 210/493.1 |
| 1955789 | 5/1971 | Fed. Rep. of Germany | 210/493.1 |
| 2729207 | 1/1978 | Fed. Rep. of Germany | 210/493.2 |

*Primary Examiner*—David L. Lacey
*Attorney, Agent, or Firm*—Merchant, Gould, Smith, Edell, Welter & Schmidt

[57] ABSTRACT

A pleated media filter element is disclosed which includes pleat spacers which are an integral structural part of the pleated media. The construction of the pleat spacers is accomplished by scoring on the unfolded media a continuous line pattern upon the portion of the media which, when folded, forms a pleat tip of the element. When the scored media is folded into pleats the patterns each define areas on the respective pleat tips which are integral structural parts of the media itself. The configuration of the pattern causes a portion of the media at the pleat tip to project transversely relative to the respective pleat, serving thereby as an integral spacer to space the pleat apart from the pleats on either side thereof.

14 Claims, 18 Drawing Figures

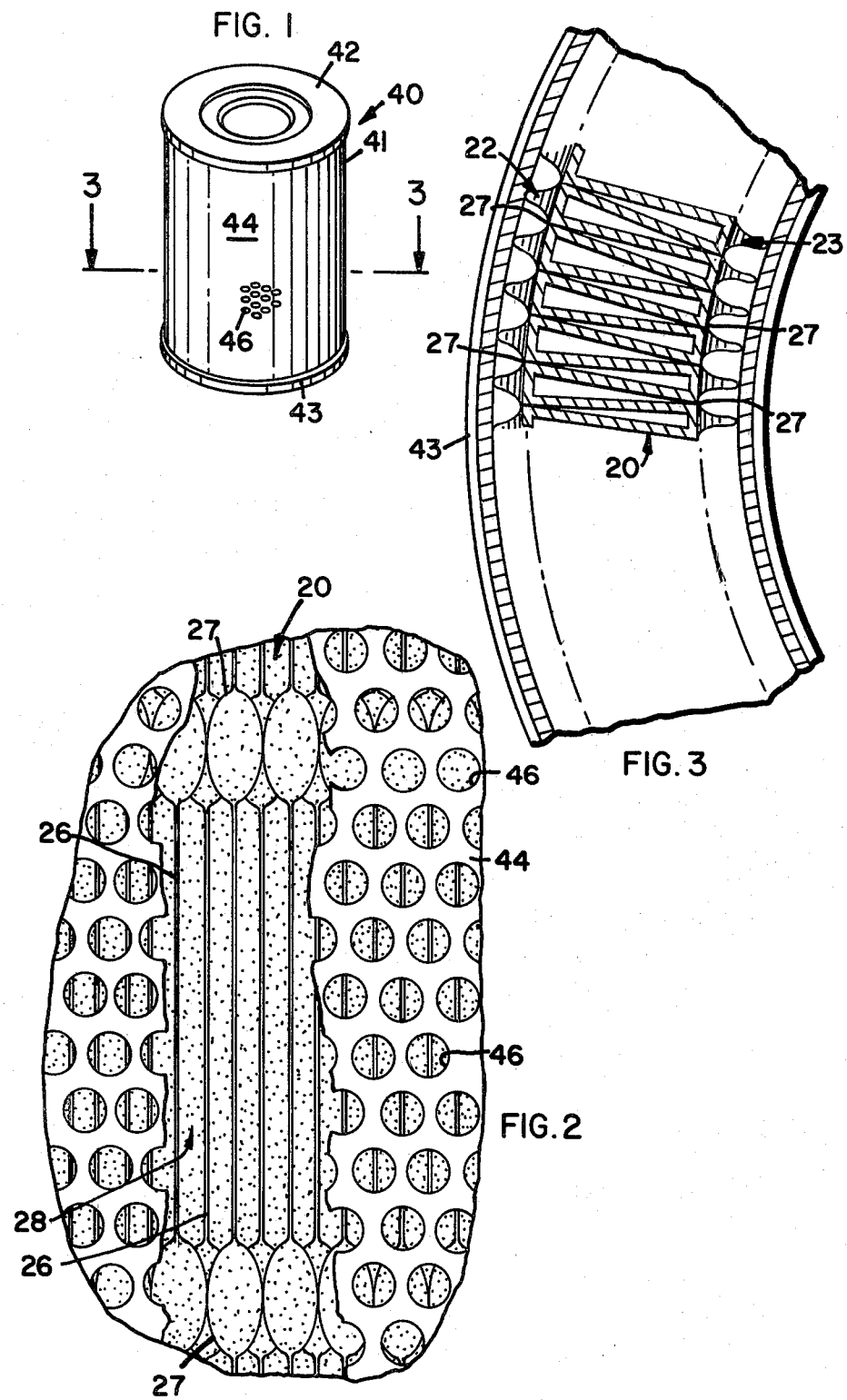

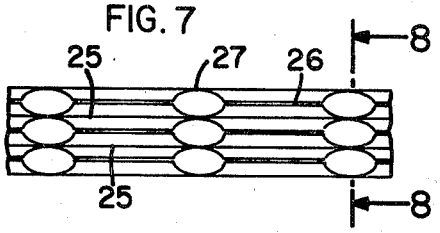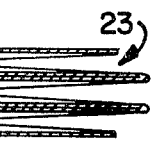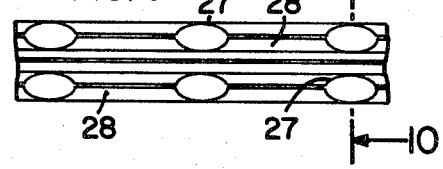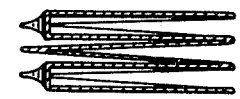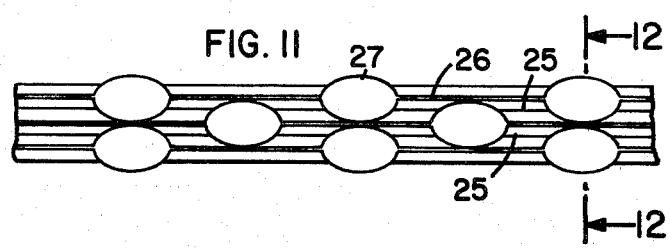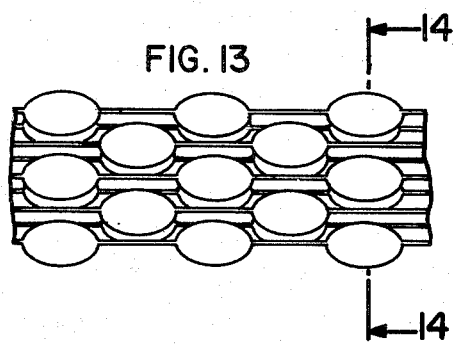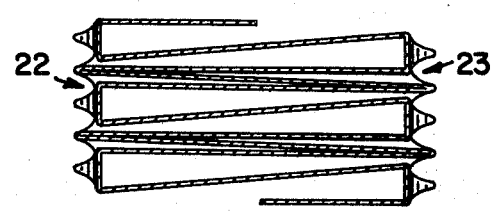

PLEATED FILTER ELEMENT HAVING INTEGRAL PLEAT SPACERS

TECHNICAL FIELD

The present invention relates to pleated filter elements and more particularly to pleat spacing mechanisms and a method of scoring the filter media to achieve an integral structural element which provides pre-determined spacing between adjacent pleats in a filter element.

BACKGROUND

In pleated media filter elements, the performance of the filter is enhanced or diminished by the ability of the contaminated fluid to pass freely and completely through the media. If open flow paths are maintained between the pleats, the filter normally operates at its optimum. If, on the other hand, the flow paths through the filter are in some way obstructed or reduced, e.g. when pleats bunch together, the filtering capacity of the media is diminished. Thus, maintaining a certain spacing between successive pleats in a filter element is extremely important to the overall performance of that element. This is especially true of filters having a relatively low pleat density and of filter elements made from non-corrugated media.

In a filter element where pleat density is low, the occurrence of pleat bunching increases as the pressure drop or differential across the filter element increases. This problem increases in severity as the heat and humidity contained within the filter are elevated. When poor pleat spacing occurs in a filter element not only does the pressure drop across a filter increase, but the effective area available for filtration is reduced. The net result is a reduction in the life of the filter caused by the unavailability of the entire filter media for filtration.

Several methods for achieving pre-determined pleat spacing have been devised by others and are known in the art. These include the use of figure eight shaped pleats, the bonding of the pleat tips to the filter liner by using a spiral bead of adhesive, and the use of string, paper or adhesive as a spacer between individual pleats. Also, various methods for corrugating or creating bumps and dimples upon the surfaces of the pleats have been employed in attempts to obtain reliable spacing between filter element pleats.

There are disadvantages however, to all of the above prior art methods. The figure eight pleat arrangement relies upon a pre-determined pleat density to obtain optimum filtration performance. Although the concept of a figure eight pleat was originally intended to achieve self-spacing pleats, such a result has not been consistently and reliably obtained from this method. Figure eight pleat configurations are difficult to obtain at high pleating rates, and the effectiveness of the figure eight pleat is largely negated under conditions of elevated temperature and humidity. Each of the methods of bonding pleat tips to a liner and placing a spacer element between the pleats requires an additional step in the manufacturing process and involves a material add-on which increases the filter construction cost. Forming dimples or bumps which project from the surface of the pleat would initially space the pleats apart, however, during the process of forming such projections the filter media itself is often damaged thereby reducing the effective area available for filtration.

The present invention provides a method for obtaining a unique pleat spacing mechanism which has been tested and found to be reliable for maintaining a given pleat spacing in a filter element, even under conditions of elevated heat and humidity. The present invention can be practiced with a standard pleating machine and at high pleating rates to achieve pleat self-spacing quite efficiently. Furthermore, the recurring disadvantages of the prior art are overcome by the present invention in that the method of practicing the invention requires a minimum of manufacturing steps and there is no need for a material add-on to achieve reliable and dependable spacing between the filter element pleats.

SUMMARY OF THE INVENTION

The present invention is a pleat spacing method and mechanism for achieving and maintaining predetermined spatial relationships between adjacent pleats in a filter element. The invention includes a unique pattern which is scored upon the portions of the filter media which will form the pleat tip areas. The pattern scoring is done prior to pleating the media. Upon pleating the scored media, the scored pattern causes the pleat tip areas to be formed in such a manner that the resulting configuration physically spaces that particular pleat from adjacent pleats on either side of it. The pattern, scored upon the general region of the pleat tip, essentially creates an integral structural projection in the filter media, and thus in the element, which allows the pleat to mechanically space itself from adjacent pleats in the filter element.

In the preferred embodiment, the pattern is scored upon either one or both sides of the filter media. The pattern is generally made with two continuous score lines, with each score line being the mirror image of the other. Each line includes alternating rectilinear and curvilinear line portions. The rectilinear line portions lie substantially side-by-side while the curvilinear line portions are spaced apart to define a substantially symmetrical area therebetween which includes a portion of the pleat tip area as well as some portion of the pleat side surfaces. The scored pattern forms an integral structural spacing configuration at the pleat tip. Upon folding the media, each curvilinear portion extends transversely from the adjacent rectilinear portions and thereby acts as a spacer for that particular pleat. The dimensions and length of each rectilinear portion and the span between the opposing curvilinear portions of the pattern will be determined by the particular application requirements of the filter element. Obviously the preferred pattern can be achieved with a single score line having an added curvilinear member at each desired location or a single rectilinear member with the curvilinear sections spliced in at the correct locations.

In an alternate pattern embodiment, the pattern again may be scored upon either or both sides of the filter media. The alternate pattern, however, will consist of one continuous score line. The line is defined by successive rectilinear line portions which are substantially parallel but spaced apart along the pattern. Adjacent rectilinear line portions are joined by a substantially shorter line which is preferably curvilinear and substantially oblique with respect to the longer substantially parallel rectilinear line portions. Upon folding the scored filter media, the alternate pattern provides a structurally integral wave-like or curvilinear configuration along the pleat tip. As is true in the preferred embodiment, the alternate scored pattern allows the pleat to self-space with respect to the pleats on either side of it due to the transversely extending line portions of the pattern.

The present invention affords a new pleat spacing method and resulting mechanism wherein the mechanism becomes an integral part of the filter media without damage to or loss of any significant amount of effective filtering area. Furthermore, the invention is accomplished during the scoring and pleating steps of the manufacturing process and requires only a modification in the scoring blades used in standard pleating machines.

These and various other advantages and features of the invention's novelty are pointed out in the claims. However, for a more complete understanding of the invention and its advantages, reference should be made to the drawings forming a part hereof and to the accompanying description, in which there is illustrated and described a preferred embodiment and alternative embodiments of the invention.

BRIEF DESCRIPTION OF THE DRAWINGS

FIG. 1 is a perspective view of a cylindrical filter assembly.

FIG. 2 is an enlarged view of a portion of the assembly shown in FIG. 1 with a portion broken away to show the filter element contained therein and the preferred pattern embodiment of the present invention.

FIG. 3 is a cross-sectional view of the cylindrical filter assembly as generally seen along line 3—3 in FIG. 1, showing a portion of the filter element contained therein.

FIG. 7 is a top plan view of a second embodiment of the present invention.

FIG. 8 is a cross-sectional view of the second embodiment of the present invention as generally seen along line 8—8 in FIG. 7.

FIG. 9 is a top plan view of a third embodiment of the present invention.

FIG. 10 is a cross-sectional view of the third embodiment of the present invention as generally seen along line 10—10 in FIG. 9.

FIG. 11 is a top plan view of a fourth embodiment of the present invention.

FIG. 12 is a cross-sectional view of the fourth embodiment of the present invention as generally seen along line 12—12 in FIG. 11.

FIG. 13 is a top plan view of a fifth embodiment of the invention.

FIG. 14 is a cross-sectional view of the fifth embodiment of the present invention as generally seen along line 14—14 in FIG. 13.

FIG. 15 is a top plan view of an alternate pattern of the present invention.

FIG. 16 is a cross-sectional view of the alternate pattern of the invention as generally seen along line 16—16 in FIG. 15.

FIG. 17 is a top plan view of a second embodiment of the alternate pattern of the present invention.

FIG. 18 is a cross-sectional view of the second embodiment of the alternate pattern of the present invention as generally seen along line 18—18 in FIG. 17.

DETAILED DESCRIPTION OF THE INVENTION

Figure 4:
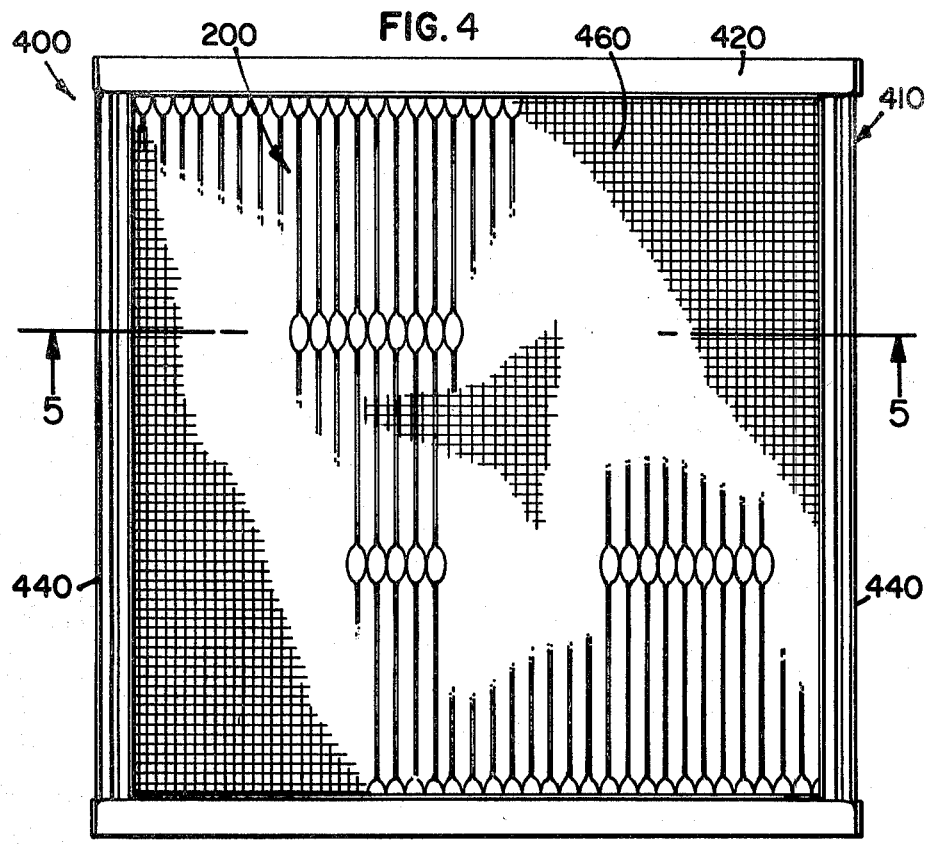
FIG. 4 is a top plan view of a filter panel assembly with portions broken away to show the filter element contained therein.

In the drawings like reference numerals are used throughout the several views to indicate the same or substantially similar elements of the invention.

PREFERRED EMBODIMENT

Reference is made to FIGS. 1-3 of the drawings wherein the preferred pattern embodiment of the invention is illustrated as it would appear when incorporated into a cylindrical filter assembly.

The cylindrical filter assembly 40 includes a housing 41 comprised of a closed annular top member 42, a closed annular bottom member 43, with an endless cylindrical side wall 44 extending between and sealingly fixed to both the top member 42 and the bottom member 43. The side wall 44 contains a repetitive arrangement of perforations 46 which provide either ingress or egress for the fluid to pass through the filter assembly 40. The pleated filter element contained within the housing 41 is arranged and secured together to form an endless, annular filter element.

Figure 5:
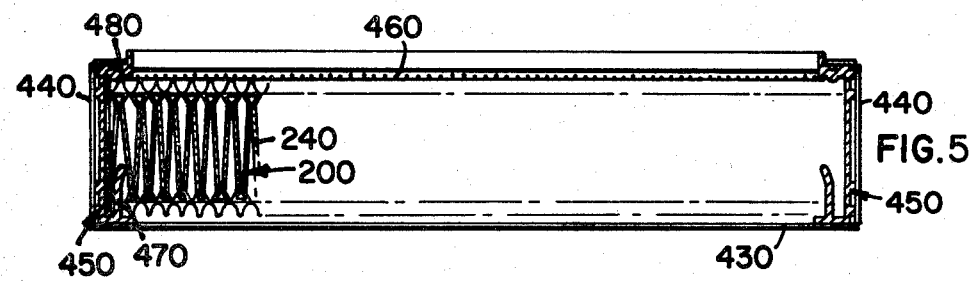
FIG. 5 is a cross-sectional view of the filter assembly as generally seen along line 5—5 in FIG. 4.
Figure 6:
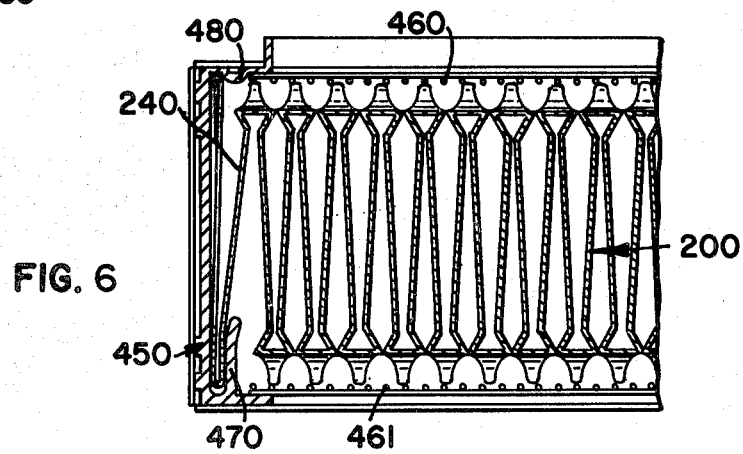
FIG. 6 is a portion of the view shown in FIG. 5, enlarged to show a cross-sectional view of the modified preferred pattern embodiment of the present invention.

A modification of the preferred embodiment is illustrated in FIGS. 4, 5, and 6. This modification will be discussed in further detail hereinafter. The filter assembly 400 shown in FIGS. 4-6 is a filter panel assembly in which the filter media has been folded in any suitable manner commonly known by those skilled in the relevant art. The filter panel assembly 400 includes a housing 410 defined by an open top member 420, an open bottom member 430, four side or end walls 440 each extending between and connected to the top and bottom members, and a first screen 460 positioned across the top member open area, between the top member 420 and the filter element 200 contained within the housing. A second screen 461 is likewise situated across the open area of the bottom member 430 and between the bottom member 430 and the filter element 200. Means 450 for securing or fixing each of the filter element's end pleat faces 240 to respective opposite ends of the housing 410 are also provided and may include a wall extension 470 and/or a protruding portion 480 for maintaining the respective pleat face 240 against the adjacent housing end wall 440. An example of this type of face securing means 450 can be seen in FIGS. 5 and 6, however it will be appreciated by those skilled in the art that a variety of other structures or, in the alternative, adhesive means may be substituted for that shown in the drawings without affecting any noticeable change in the practice of the invention as will become apparent in the discussion which follows.

It should be understood at this point in the description that the foregoing discussion of two types of filter assemblies is merely for the purpose of illustrating examples of the environment in which the present invention may be used. Other filter assemblies are well known in the art and thus, these two particular types of assemblies are not to be construed as being a limitation upon the invention.

In FIG. 2 a portion of the perforated side wall 44 has been broken away and the underlying filter element 20 enlarged to illustrate the scored pattern of the preferred embodiment. The pattern, as it would appear in cross-section, is shown in FIG. 3. In each of the illustrated filter elements 20, 200, the filter media, preferably corrugated paper, has been scored with the same pattern. The pattern is scored at locations along the roll of filter media where, typically, in the prior art only a single straight score line for creating the pleat tip would be provided. In the invention, the pattern is impressed in the media at successive pleat tip areas. The scored filter media is then folded into a pleated element. A pair of coextensive, continuous lines comprise the pattern of the preferred embodiment. Each line is made up of alternating rectilinear line portions 26 and curvilinear line portions 27. The alternating line portions 26, 27 are arranged so that both score lines in the pattern are mirror images of the other. In the pattern shown in FIGS. 1-3 the media is scored only once upon the media at any one pleat tip area. In the modification shown in FIGS. 4-6, the pattern is scored on both sides at each pleat tip area thereby reinforcing the pattern to the extent an indentation of the pleat surface areas immediately adjacent the curvilinear portions of the pattern. See FIG. 5.

The present invention advances the state of the art for filter pleat spacing in that no material add-on is required, manufacturing costs are necessarily reduced, and the mechanism is durable as well as reliable. To understand how the present invention accomplishes such pleat spacing, a brief description of how the pattern is achieved must be understood. The preferred method for practicing the invention requires a modification of the scoring blades used in standard pleating machines. Instead of a single straight blade, two symmetrical relatively thin blades are used. In the preferred embodiment the blades are designed identical to the pattern seen in FIG. 2 wherein a rectilinear line portion is alternated with a curvilinear line portion along the full length of each blade. Each scoring facility will have a series of the double symmetrical blade arrangements. In this manner both sides of the filter media passing therebetween may be scored with the pattern.

Turning again to FIGS. 1 through 6 it can be seen that to produce the preferred embodiment of the present invention the pairs of blades on each scoring facility are arranged so that the scored patterns for adjacent pleats are aligned with respect to both the curvilinear line portions as well as the rectilinear line portions. In this way folding the scored media will yield a filter element in which the filter element first side or upper row of pleat tips 22, as well as the filter element second side or lower row of pleat tips 23, are self-spaced by the abutment of adjacent curvilinear line portions 27. Spaces are thus created between the rectilinear line portions 26 of adjacent pleats which provide openings 28 in the filter element for fluid flow directly into the element between the pleats. These openings are maintained by the continuous abutment of the aligned curvilinear scored portions 27.

From the foregoing it should be readily apparent that the invention allows the manufacture of a filter element in which maximum filtration area on the filter media is retained and the pleats self-space without requiring additional steps from those of the original scoring step. Numerous variations in the width of the pleat tip portion defined between the curvilinear line portions can be selected. Also, the generally elliptical symmetrical space may instead be a diamond shape or a more circular shape, among others. And, the pairs of closely spaced, side-by-side rectilinear line portions may be replaced by a single rectilinear line portion. The rigidity or strength of the filter media, as well as the fact that the media is corrugated or non-corrugated, can be considered and the pattern modified to take such considerations into account to achieve optimum filter performance. Bunching of the pleats is virtually prohibited by the alignment of the various portions of the pattern. And the fact that the pleat tip portion, contained between the curvilinear lines of the pattern, is undisturbed or unaffected by additional score lines or fiber destruction insures the overall strength of the pleated media.

The pleat spacing mechanism of the present invention insures a filter element will function under elevated temperatures and humidity by virtue of its ability to maintain the proper spacing between its pleats. As a result, the life of the filter element is extended beyond that which has presently become acceptable in the trade due to the deficiencies of prior art pleat spacing methods and devices.

Now that the preferred embodiment of the invention and the method for practicing the invention are understood, alternate embodiments of the invention can be appreciated.

A second embodiment of the above-described pattern is shown in FIGS. 7 and 8. This embodiment is substantially identical to the preferred embodiment. The difference lies in the fact that only one side of the filter media, and hence only one side of the filter element, is scored with a pattern of rectilinear and curvilinear line portions 26, 27. Successive pleat tip areas on the other side of the filter media are each scored with a straight blade to yield a continuous score line 25 for the pleat tip. With this embodiment only the pleat tip 22 on one side of the filter element are self-spacing. See FIG. 8. The pleat tip 23 on the other side of the element contain only a scored straight fold line 25. With certain filter media this embodiment will prove satisfactory for spacing purposes in that the filtration demands and environmental factors such as elevated temperatures and humidity will not be so severe as to require additional pleat spacing other than at one side of the filter element.

A third embodiment is illustrated in FIGS. 9 and 10. In this embodiment the pattern is scored only upon every other pleat tip portion and only upon one side of the media. The individual pleat tip portions not scored with the pattern are instead scored with a straight blade to merely allow folding of the media along the pleat tip. In certain filter applications pleat spacing requirements may be such as to allow the sides of a pleat to be contacted on each side by a curvilinear line portion 27 of an adjacent pleat. As can be readily seen in FIG. 9 openings 28 will be maintained between pleat tip portions along one side of the element to allow unobstructed flow of a fluid from one side of the filter element to the other side. The opposite side of the filter media is scored with a straight blade and folded along these score lines to form the pleat tips shown in FIG. 10 which are well known in the prior art.

In FIGS. 11 and 12 a fourth embodiment is shown in which the pattern is scored upon only one side of the filter media and the pattern on each pleat tip area is offset with respect to the pattern on adjacent pleat tip areas on either side thereof. Hence only one side of the filter element will contain the spacing mechanism. The pleat tips on the opposite side of the filter element are not scored with the pattern, instead a straight blade score line 25 is used to allow folding of the media into pleats. See FIG. 12.

In FIGS. 13 and 14 a fifth embodiment is shown in which both sides of the filter media are scored with the pattern in order to achieve self-spacing pleats along both sides 22,23 of the filter element. In this embodiment the pattern is scored on each side of the filter media so that every first and third pleats have aligned curvilinear pleat portions and every second and fourth pleats have aligned curvilinear line portions. See FIG. 14. This embodiment illustrates the use of the present invention in a filter application in which the pleat density of the filter element is relatively high in comparison, for example, with the pleat densities shown in FIGS. 7-12.

Although the use of a pair of symmetrical blades to achieve the above described pattern embodiments is the preferred way to practice the invention, an alternate pattern embodiment is possible which when scored along the pleat tip portions of a pleated filter element also yields self-spacing pleats. In FIGS. 15-18 two embodiments of a single blade pattern are illustrated.

Referring now to FIGS. 15 and 16 it can be seen that the blades which are used to score the pleat tip portions of one side 220 of the filter element are essentially mirror images of each other. Rather than placing the two blades side-by-side as is done in the scoring of the pattern of the preferred embodiment, the blades are separated so that every other pleat tip portion on one side of the filter media is scored with a single score line pattern. See FIG. 15. In this embodiment the blades used are each comprised of alternating parallel line segments 260 joined at their respective adjacent ends by a substantially shorter line segment 270 arranged obliquely with respect to the parallel segments 260.

As the media is scored, one side is impressed by the above-described blades while the second side is scored in an ordinary manner with a straight blade line 250 to facilitate the folding of the media. When the scored media is folded the resulting pleat spacing mechanism assumes a wave-like appearance in which one side of the filter element contains flat substantially elliptical shaped openings 280 and alternating with areas of closely spaced pleat tip portions 290 throughout one side of the filter element, the other side of the filter element being without the pleat spacing mechanism. See FIG. 16.

In FIGS. 17 and 18 a second embodiment of the alternate scoring pattern is shown. The parallel line portions 260 and connecting oblique line segments 270 form a smooth continuous curvilinear score line. The pattern is scored upon both sides of the filter media and hence both sides, or edges of the filter element are provided with the spacing mechanism. Thus, self-spacing pleats are achieved at both sides 220, 230 of the filter element. Both sides of the filter element will appear identical and contain alternating flattened elliptical openings 280' and contacting portions 290' throughout that particular side of the filter element. See FIG. 17.

From the foregoing description numerous variations and combination of patterns are possible to achieve the particular pleat spacing and pleat density desired in a specific filter application. The invention lies in the discovery that a pleated filter element can be manufactured in a manner such that the step in which the media is scored is also the step where the pleat spacing mechanism becomes an integral part of the filter element. In providing an integral pleat spacing mechanism the invention avoids the prior art problems of material add-ons. In using relatively thin, sharp-edged symmetrical or single blade arrangements little if any damage is done to the filter media other than that which is necessary in order to pleat the media. Fluid flow restriction is reduced to a minimum by selecting a pleat spacing embodiment which affords the necessary amount of open area between adjacent pleats to achieve the desired filtration rates therethrough. The long-standing problem of pleat bunching is virtually eliminated by the structural integrity of the resulting pleat spacing mechanisms. And the pattern is scored at the pleat tip portions, a location on the filter element which is often the most vulnerable area of the element where bunching will occur.

Thus, while the present invention as disclosed herein is represented by a preferred and several embodiments, as well as an alternate embodiment, it is to be understood that such embodiments are represetive and not inclusive. Other embodiments of the invention are possible which are within the scope of the claims which follow.

What is claimed is:

1. In a filter element having a succession of interconnected pleats, each of said pleats having an individual pleat tip portion defining an outermost edge of said filter element, wherein said filter element further includes integrally formed pleat spacing means, said pleat spacing means being the sole spacing means for said element and comprising:
    a pattern scored upon a plurality of said pleat tip portions, said pattern including a continuous score line, said score line including a plurality of curvilinear line portions each configured to project said respective pleat tip portion a predetermined distance and generally transversely with respect to adjacent pleats on either side thereof, each of said pleats is spaced apart from an adjacent pleat thereto along said respective score lines on said pleat tip portions such that adjacent projected pleat tip portions abut each other along said score lines.

2. In a filter element having a succession of interconnected pleats, each of said pleats having an individual pleat tip portion defining an outermost edge of said filter element, wherein said filter element further includes integrally formed pleat spacing means, said pleat spacing means being the sole spacing means for said element and comprising:
    a pattern scored upon the tip portions of each of a plurality of said pleats, said pattern including a continuous score line, said line including alternating rectilinear line portions and curvilinear line portions, said curvilinear line portions containing a substantially symmetrical portion of said pleat tip portion therebetween, said symmetrical pleat portion projecting transversely with respect to said respective rectilinear line portions, with said pattern being configured so as to maintain a predetermined spatial relationship between each of said pleats and the respective pleats on either side thereof such that adjacent projecting pleat portions abut each other along said score lines.

3. The filter element of claim 2 wherein said pattern is scored upon each of said individual pleat tip portions, each of said patterns being aligned with respect to said pattern on adjacent pleats on either side thereof.

4. The filter element of claim 2 wherein each pleat is connected to an adjacent pleat on either side thereof by a common pleat tip portion, said pattern being scored upon each of said common pleat tip portions and upon each of said individual pleat tip portions, said pattern on each of said common pleat tip portions being aligned with respect to each other and said patterns on each of said individual pleat tip portions being aligned with respect to each other.

5. The filter element of claim 2 wherein said pattern is scored upon each of said individual pleat tip portions, and each of said patterns is offset with respect to said patterns on said pleat tip portions on either side thereof.

6. The filter element of claim 2 wherein each of said pleats is connected to said pleats on either side thereof by a common pleat tip portion, said pattern being scored upon each of said common pleat tip portions and each of said individual pleat tip portions, each of said patterns on said common pleat tip portions being offset with respect to said patterns on said pleats on either side thereof, and each of said patterns on said individual pleat tip portions being offset with respect to said patterns on said pleats on either side thereof.

7. The filter element of claim 2, 3, 4, 5, or 6 wherein each of said curvilinear line portions of each of said patterns define a generally elliptical area on said respective pleat portion.

8. In a filter element having a succession of interconnected pleats, each of said pleats having an individual pleat tip portion defining an outermost edge of said filter element, wherein said filter element further includes integrally formed pleat spacing means, said pleat spacing means being the sole spacing means for said element and comprising:
   a pattern scored upon each of said individual pleat tip portions, said pattern including a continuous arrangement of spaced-apart, substantially parallel line segments and shorter substantially oblique line segments, each of said parallel line segments being connected to an adjacent parallel line segment on either end thereof by one of said shorter oblique line segments;
   said scored oblique line segments each projecting said respective pleat tip portion transversely from said respective pleat a distance sufficient to maintain a pre-determined spatial relationship between said respective pleat and adjacent pleats on either side thereof.

9. The filter element of claim 8 wherein each of said pleats is connected to an adjacent pleat on either side thereof by a common pleat tip portion, with said pattern being scored upon each of said common pleat tip portions.

10. In a filter element having a succession of interconnected pleats, each of said pleats having an individual pleat tip portion defining an outermost edge of said filter element and wherein each of said pleats is connected to an adjacent pleat on either side thereof by a common pleat tip portion defining an innermost edge of said filter element, said filter element further including integrally formed means for spacing each of said pleats apart from adjacent pleats on either side thereof, said pleat spacing means comprising:
   a pattern scored upon each of said individual pleat tip portions and upon each of said common pleat tip portions, said pattern including two coextensive, continuous score lines, each of said score lines including alternating rectilinear line portions and curvilinear line portions;
   said patterns on said common pleat tip portions being aligned with respect to each other and said patterns on said individual pleat tip portions being aligned with respect to each other;
   said curvilinear line portions of each pattern defining a substantially symmetrical portion of said respective pleat tip portion therebetween, each of said symmetrical pleat tip portions projecting tranversely relative to said rectilinear line portions of said respective pattern, said pattern being configured so as to maintain a predetermined spacing between said respective pleat and said pleats on either side thereof.

11. The filter element of claim 10 wherein each of said curvilinear line portions of each of said patterns defines a generally elliptical area therebetween on said respective pleat tip portion.

12. In a filter element having a succession of interconnected pleats, each of said pleats having an individual pleat tip portion defining an outermost edge of said filter element and wherein each of said pleats is connected to an adjacent pleat on either side thereof by a common pleat tip portion defining an innermost edge of said filter element, said filter element further including integrally formed means for spacing each of said pleats apart from adjacent pleats on either side thereof, said pleat spacing means comprising:
   a pattern scored upon each of said individual pleat tip portions and upon each of said common pleat tip portions, said pattern including two coextensive, continuous score lines, each of said score lines including alternating rectilinear line portions and curvilinear line portions;
   said pattern on each of said common pleat tip portions being offset with respect to said patterns on said common pleat tip portions of said pleats on either side thereof, and said pattern on each of said individual pleat tip portions being offset with respect to said patterns on said individual pleat tip portions of said pleats on either side thereof;
   said curvilinear line portions of each pattern defining a substantially symmetrical portion of said respective pleat tip portion therebetween, each of said symmetrical pleat tip portions projecting transversely relative to said rectilinear line portions of said respective pattern, said pattern being configured so as to maintain a predetermined spacing between said respective pleat and said pleats on either side thereof.

13. The filter element of claim 12 wherein each of said curvilinear line portions of each of said patterns defines a generally elliptical area therebetween on said respective pleat tip portion.

14. In a filter element having a succession of interconnected pleats, each of said pleats having an individual pleat tip portion defining an outermost edge of said filter element and wherein each of said pleats is connected to an adjacent pleat on either side thereof by a common pleat tip portion, said filter element further including means for spacing each of said pleats apart from adjacent pleats on either side thereof, said pleat spacing means comprising:
   a pattern scored upon each of said individual pleat tip portions and each of said common pleat tip portions, said pattern including a continuous arrangement of spaced-apart, substantially parallel line segments and shorter substantially oblique line segments, each of said parallel line segments being connected to an adjacent parallel line segment on either side thereof by one of said shorter oblique line segments;
   each of said scored oblique line segments projecting said respective pleat tip portion transversely from said respective pleat a distance sufficient to maintain a pre-determined space between said respective pleat and adjacent pleats on either side thereof by the abutment of adjacent projecting pleat tip portions.

* * * * *